Patented Mar. 26, 1946

2,397,396

UNITED STATES PATENT OFFICE 2,397,396

PREPARATION OF GUANAMINES

Pierrepont Adams, Stamford, Conn., assignor to American Cyanamid Company, New York, N. Y., a corporation of Maine No Drawing. Application August 3, 1943, Serial No. 497,214

10 Claims. (Cl. 260—249.5)

This invention relates to a new and improved process of preparing guanamines.

Guanamines are heterocyclic compounds having the triazine ring and may be represented by the following general formula:

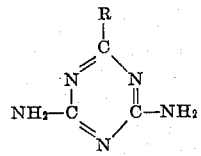

in which R is an organic radical attached to the carbon atom of the triazine nucleus by a carbon to carbon bond. These compounds may also be designated as 4,6-diamino-1,3,5-triazines with approximate designation of the 2 position substituent. Although guanamines, in general, are known compounds and have been prepared by various methods, the known methods have, for one reason or another, disadvantages restricting their use.

I have discovered that guanamines can be easily prepared in good yields by reacting a desired acyl dicyandiamide, cyanamide and water under the conditions more specifically set forth hereinafter. The reaction of acyl dicyandiamides with cyanamide to produce guanamines may be broadly illustrated by the following equation:

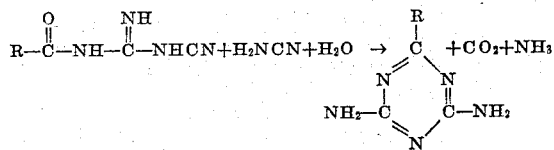

I do not intend to imply by the above equation that the formation of guanamines from acyl dicyandiamides and cyanamide is as simple as illustrated. The equation is intended to show merely the initial reactants and the final reaction product. Undoubtedly, the formation of guanamine takes place through a series of reactions probably involving addition of cyanamide to the acyl dicyandiamide, cyclization of the resulting product, hydrolysis and final liberation of carbon dioxide and ammonia as illustrated. Several intermediate reaction products can be postulated but since these have not been positively identified by me as yet, I do not wish to be bound by any theory or supposed course of reaction.

As will be apparent from the above equation, I ordinarily use substantially equal molecular proportions of acyl dicyandiamide and cyanamide. However, higher proportions of either reactant may be employed if desired without adversely affecting the ultimate formation of guanamines.

In carrying out the reaction, I prefer to dissolve the acyl dicyandiamide and cyanamide in water and bring about the reaction by heating the solution at refluxing temperatures until the formation of guanamine has been substantially completed as indicated by the decrease in the rate of evolution of carbon dioxide from the reaction mixture. It is not necessary that the solvent for the reactants consist entirely of water, however, since other water miscible solvents such as, alcohol, acetone, Cellosolve, etc. may be employed in part if desired.

As it is known that acyl dicyandiamides will hydrolyze to the corresponding acyl guanylureas in solutions of moderately strong acids and that acyl dicyandiamides will hydrolyze in moderately strong alkaline solutions to yield dicyandiamide, I prefer to carry out my reaction without the addition of either acids or alkalies thereto. Since both acyl dicyandiamides and cyanamide have an acidic reaction, it will be found that the reaction mixture normally has a pH on the acid side. Ordinarily, the reaction may be conducted at a pH of anywhere from about 4 to 8.

In order to bring about the reaction within a reasonable time, it is necessary to use elevated temperatures. For convenience, I generally heat the reaction mixture to its refluxing temperature although any temperature of from about 70° to 120° C., or so, will be found satisfactory. Formation of guanamine will be complete when the evolution of carbon dioxide has substantially ceased, generally, within one hour at refluxing temperature.

The cyanamide employed by me is a well known article of commerce being usually obtained in the form of an aqueous solution thereof. I may, however, use the dry crystalline cyanamide if desired.

The acyl dicyandiamides suitable for use in my reaction are fully described in the co-pending application of Donald W. Kaiser and Jack T. Thurston, Serial No. 445,206, filed May 30, 1942. These compounds are prepared by mixing an acylating agent such as an acyl halide or anhydride with dicyandiamide, water and an alkali metal hydroxide and allowing the mixture to react at temperatures not in excess of about 60° C. until an acyl dicyandiamide is formed. Preparation of representative acyl dicyandiamides is illustrated in the specific examples following hereinafter. Others may be prepared in like manner. I may use in my reaction any of the acyl dicyandiamides disclosed in the aforesaid Kaiser and Thurston application. Among such acyl dicyandiamides may be specifically mentioned: benzoyl dicyandiamide, caproyl dicyandiamide, lauroyl dicyandiamide, stearoyl dicyandiamide, p-nitrobenzoyl dicyandiamide, ω-carboxypropionyl dicyandiamide, o-carboxybenzoyl dicyandiamide, p-carboxybenzoyl dicyandiamide, naphthenoyl dicyandiamide, and many others.

In the preparation of aliphatic substituted guanamines by the reaction of biguanide with certain aliphatic esters by known methods it has been noted that when using esters of the higher molecular weight fatty acids, the yield of aliphatic guanamines by this process is poor. It is an advantage of my process that I can easily prepare the higher molecular weight aliphatic substituted guanamines in good yields. I can, therefore, prepare guanamines in which R, in the general formula above, is an aliphatic radical of at least 6 carbon atoms whereas by the above mentioned process the production of guanamines with aliphatic substituents of this chain length is not feasible.

My invention will now be described in greater particularity by means of the following specific examples. It should be understood, however, that these examples are given merely for purposes of illustration and are not to be construed as limiting my invention to the particular reactants or reaction conditions described therein.

EXAMPLE 1

*Benzoguanamine*

A solution of 63.5 g. of 95% sodium hydroxide dissolved in 125 cc. of water was placed in a three necked flask provided with a stirrer, dropping funnel, and thermometer. To this solution was added with stirring, 63 g. of pulverized dicyandiamide. After the dicyandiamide was dissolved, 150 cc. of acetone was added to the solution. The resulting double layer was agitated thoroughly and the temperature kept between 20-25° C. while 70.2 g. of benzoyl chloride was added in the course of one-half hour. During this time, a solid separated, but addition of water after the reaction was complete gave a clear light yellow solution. The solution was then acidified with acetic acid whereupon benzoyl dicyandiamide was precipitated as a colorless solid.

To 500 g. of water, heated to 95° C., was added 85 g. of an aqueous solution of 24.8% cyanamide and 94 g. of benzoyl dicyandiamide prepared as described above. The mixture was held at 90° C. for 20 minutes during which time carbon dioxide was evolved. The reaction mixture was then cooled to room temperature and filtered and the precipitate washed with a dilute solution of caustic soda and then with water. The washed precipitate was then recrystallized from an aqueous solution containing 10% Cellosolve. The recrystallized and dried product had a melting point of 224 to 226° C. and when mixed with a known sample of benzoguanamine showed no depression of the melting point. Chemical analysis of the product checked closely with the theoretical values for those calculated for benzoguanamine.

EXAMPLE 2

*m-Nitrobenzoguanamine*

A solution of 18.5 g. of m-nitrobenzoyl chloride dissolved in 50 cc. of acetone was added to a cooled mixture of 20 cc. of 50% sodium hydroxide, 10 g. of dicyandiamide, 50 cc. of acetone, and 20 cc. of water. The temperature was kept at 5-10° C. while adding the m-nitrobenzoyl chloride. The mixture was then diluted with water, neutralized with acetic acid and filtered. The material was then dissolved in an excess of hot potassium hydroxide solution and the solution then cooled whereupon the potassium salt of m-nitrobenzoyl dicyandiamide was precipitated. m-Nitrobenzoyl dicyandiamide was recovered from its salt by dissolving the latter in water and neutralizing the solution with hydrochloric acid.

8 g. of m-nitrobenzoyldicyandiamide prepared as described above was added to 10 g. of a 23% solution of cyanamide and 50 g. of water. The mixture was boiled for 10 minutes after which 15 g. of 10% sodium hydroxide was added, cooled to 50° C. and filtered. The precipitate was washed with water until neutral and then dried. The solid material was redissolved in a hot 50% aqueous solution of Cellosolve and the solution cooled and filtered. The filtrate was then diluted with water whereupon a precipitate of m-nitrobenzoguanamine was obtained. After the product was filtered and dried, it was found to have a melting point of 243-245° C. There was no change in its melting point after another recrystallization from 10% Cellosolve.

EXAMPLE 3

*Caproguanamine*

A solution of 84.4 g. of 95% sodium hydroxide in 300 cc. of water was prepared and divided into two equal proportions. One of the parts was placed in a three necked flask fitted with a stirrer, thermometer and two dropping funnels. 126 g. of dicyandiamide in 300 cc. of acetone was then added to the caustic soda solution in the flask. The mixture in the flask was stirred and maintained at 20° C. while the second proportion of the alkali solution was added simultaneously with 134.5 g. of caproyl chloride. After the addition was complete, the reaction mixture was diluted with water and acidified with acetic acid whereupon caproyl dicyandiamide was precipitated as a colorless solid.

To 18.2 g. of recrystallized caproyl dicyandiamide dissolved in 100 cc. of 95% ethanol at 75° C. was added 40 g. of 24% cyanamide and the mixture refluxed for one hour. Carbon dioxide was evolved from the reaction mixture during the reaction. The clear solution was then cooled and 40 g. of 10% solution of sodium hydroxide added. The precipitate which formed was recovered by filtration, washed until neutralized with water and dried. This product was then dissolved in 95% ethyl alcohol, filtered, and precipitated by dilution with water. After drying at 105° C. it was found to have a melting point of 168-170° C. and showed no depression of the melting point when mixed with a known sample of caproguanamine.

I claim:

1. A method of preparing guanamines which comprises heating an acyl dicyandiamide with cyanamide in the presence of water and separating the formed guanamine.

2. A method of preparing aromatic substituted guanamines which comprises heating an aromatic acyl dicyandiamide with cyanamide in the presence of water and separating the formed guanamine.

3. A method of preparing benzoguanamine which comprises heating benzoyl dicyandiamide with cyanamide in the presence of water and separating the formed guanamine.

4. A method of preparing aliphatic substituted guanamines which comprises heating an aliphatic acyl dicyandiamide with cyanamide in the presence of water and separating the formed guanamine.

5. A method of preparing caproguanamine which comprises heating caproyl dicyandiamide with cyanamide in the presence of water and separating the formed guanamine.

6. A method of preparing guanamines which comprises heating at temperatures of at least 70° C. in aqueous media an acyl dicyandiamide and cyanamide and separating the formed guanamine.

7. A method of preparing guanamines which comprises heating an aqueous solution of an acyl dicyandiamide and cyanamide at refluxing temperature until the evolution of carbon dioxide has substantially ceased and separating the formed guanamine.

8. A method of preparing guanamines which comprises heating at elevated temperatures an aqueous solution of an acyl dicyandiamide and cyanamide, said solution having a pH within the range of 4 to 8, until a guanamine has been formed.

9. A method of preparing benzoguanamine which comprises heating at elevated temperatures an aqueous solution of benzoyl dicyandiamide and cyanamide, said solution having a pH within the range 4 to 8, until benzoguanamine has been formed.

10. A method of preparing an aliphatic substituted guanamine in which the aliphatic substituent has at least 6 carbon atoms which comprises heating at temperatures of at least 70° C. an aqueous solution of an aliphatic acyl dicyandiamide, said aliphatic substituent having at least 6 carbon atoms, and cyanamide and continuing the heating until the evolution of carbon dioxide has substantially ceased and a guanamine has been formed.

PIERREPONT ADAMS.